March 15, 1966　　　W. M. LEEDS　　　3,240,896
PREDETERMINED CURRENT RELAY FOR CONDUCTORS ENTERING A TANK
Filed Dec. 18, 1963

WITNESSES:
John L. Chopp
James F. Young

INVENTOR
Winthrop M. Leeds
BY
Clement L. McHale
ATTORNEY

United States Patent Office 3,240,896
Patented Mar. 15, 1966

3,240,896
PREDETERMINED CURRENT RELAY FOR
CONDUCTORS ENTERING A TANK
Winthrop M. Leeds, Forest Hills, Pa., assignor to Westinghouse Electric Corporation, Pittsburgh, Pa., a corporation of Pennsylvania
Filed Dec. 18, 1963, Ser. No. 331,625
14 Claims. (Cl. 200—87)

This application is a continuation-in-part of copending application Serial No. 175,102 filed February 23, 1962 now abandoned and assigned to the same assignee as the present application.

This invention relates, generally, to relays and, more particularly to relays for detecting overload currents in power circuit breakers and other electrical apparatus enclosed in metal tanks.

During the operation of power circuit breakers and transformers which are cooled by a fluid circulated by means of motor driven fans or pumps it is necessary that the circulating devices be turned on when the load current reaches a predetermined value. This can be done by utilizing a relay energized by current from a current transformer connected in the load circuit. However, current transformers are relatively expensive.

An object of this invention is to provide a relay which does not require a current transformer or other external means for energizing the relay.

Another object of the invention is to provide an overload relay which is mounted directly on the tank or housing of a circuit breaker or a transformer.

A further object of the invention is to provide a relay which may be readily adjusted to operate at different values of overload current.

Other objects of the invention will be explained fully hereinafter or will be apparent to those skilled in the art.

In accordance with one embodiment of the invention a relay having a spring-biased armature is so mounted on the tank of a circuit breaker that the armature is actuated by flux produced by the current flowing through the terminals of the circuit breaker. A non-magnetic member or weld in the breaker tank is disposed between the two terminals of the breaker and the relay armature extends across the member or weld, thereby providing a path for the flux which closes the armature against the force of a biasing spring. The relay may be adjusted to close at different values of load current by changing the armature air gap, or by changing the force of the biasing spring, or by changing both the air gap and the spring force.

Figure 1:
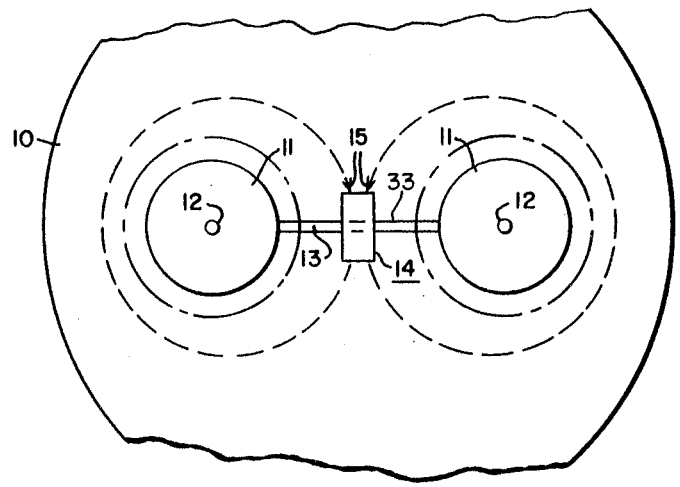
Figure 2:
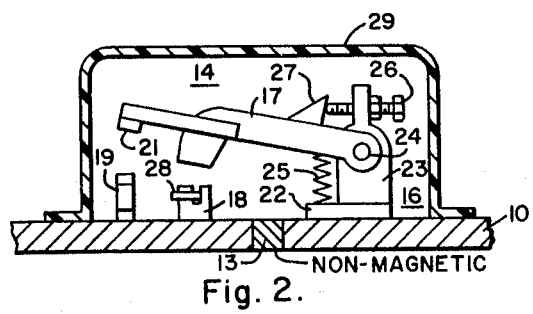

For a better understanding of the nature and objects of the invention, reference may be had to the following detailed description, taken in conjunction with the accompanying drawing, in which:

FIGURE 1 is a view, in top plan, of a portion of a circuit breaker having a relay embodying the invention mounted on the breaker tank, and FIGURE 2 is an enlarged detail view, partly in section and partly in elevation, of the relay.

Referring now to the drawing, and particularly to FIGURE 1, a circuit breaker or transformer tank 10, only a portion of which is shown, has two spaced terminal bushings 11 mounted on top of the tank in the usual manner. Each of the bushings 11 has a centrally disposed conductor 12 extending longitudinally through the bushing. The conductors 12 may be connected externally to power conductors (not shown).

As described and claimed in a copending application Serial No. 144,720, filed October 12, 1961, and assigned to the same assignee as this application, a non-magnetic weld or member 13 extends between the openings for the terminal bushings 11 in a magnetic gap 33 in the top of the tank 10. The non-magnetic member or weld 13 is utilized to reduce hysteresis and eddy current losses in the steel tank tops by providing a gap breaking complete iron circuits around the conductors 12, especially for current ratings of 3000 amperes and higher.

The non-magnetic member 13, which may bridge as well as substantially fill the magnetic gap 33 provided, may be secured to the top of the tank 10 by other means, such as bolts with suitable gasketing or by a suitable bonding or cementing material, such as epoxy resin, rather than by welding, brazing or other types of metal joining which are preferred when the nonmagnetic member 13 is metallic as well as non-magnetic. In certain applications, the non-magnetic member 13 may be formed from a material which is also electrically insulating or non-conducting. For example, the member 13 may be formed from filled epoxy or polyester resins. The member 13 may also comprise an electrically insulating fluid, such as liquid oil or sulfur hexafluoride in gaseous or liquid form, which substantially fills the magnetic gap 33 provided in the top of the tank. In the latter arrangement, the cover 29 of the relay 14 could be extended to seal off the opening made by the gap in the magnetic material in the top of the tank 10 between the bushings 11.

In order to provide a simple and inexpensive means which may be utilized for controlling the operation of a cooling fluid circulating fan or pump (not shown) a relay 14 is so mounted on top of the tank 10 between the terminal bushings 11 that the magnetic flux available across the non-magnetic member or weld 13 is utilized to actuate the relay when the load current in the conductors 12 exceeds a predetermined value. As shown by the arrows 15 in FIGURE 1, the magnetic flux produced by the current in the conductors 12 must follow a path through the relay 14 across the non-magnetic member or weld 13. Thus, the relay 14 may be utilized to start a motor-driven fan or pump when the load current in a breaker or a transformer exceeds a predetermined value and to stop the fan or pump when the current drops below the predetermined value.

As shown in FIGURE 2, the relay 14 comprises a support 16, an armature 17, a pole piece 18, a fixed contact member 19 and a movable contact member 21 carried by the armature 17. The support 16 has a base portion 22 and an upright portion 23. The base 22 is secured to the top of the tank 10 at the one side of the non-magnetic member or weld 13 in the tank.

The armature 17 is pivotally mounted on the upright portion 23 by means of a pin 24. The pole piece 19 is secured to tank 10 at the side of the member or weld 13 opposite the support 16. The pole piece 19, the armature 17 and the support 16 are preferably composed of laminated iron.

A spring 25 is disposed between the base 22 and the armature 17 to bias the armature upwardly, thereby providing an air gap between the armature and the pole piece 18. The length of the air gap may be changed by adjusting a screw 26 which is threaded into the upright 23 to engage a stop projection 27 on the armature 17 to limit the upward movement of the armature caused by the spring 25.

It will be seen that the support 16, the armature 17 and the pole piece 18 provide a path across the member or weld 13 for flux produced by the current flowing in the conductors 12. Thus, the armature 17 will be actuated into engagement with the pole piece 18 when the current exceeds a predetermined value depending upon the length of the air gap between the pole piece 18 and the armature 17 and also upon the force of the biasing spring 25.

When the armature 17 engages the pole piece 18 the movable contact member 21 engages the fixed contact member 19. It will be understood that these contact members may be connected in an electric circuit to control the operation of a motor which drives a fan or pump for circulating a cooling fluid.

In order to reduce chattering of the armature 17 when it is closed against the pole piece 18, a copper shading coil 28 is placed around a portion of the pole piece 18. A cover 29, preferably composed of non-magnetic metal or a plastic may be provided to protect the relay from dirt and moisture.

From the foregoing description it is apparent that the invention provides a simple and inexpensive relay which may be mounted on top of a circuit breaker tank or a transformer housing and which utilizes the magnetic flux produced by the current flowing through the terminal conductors of the breaker or other device to actuate the relay, thereby controlling the operation of a motor driven fan or pump for circulating a fluid for cooling the device during overload conditions.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In combination, a tank formed from magnetic material and containing electrical apparatus, two spaced conductors entering the tank to conduct current through the apparatus, a gap in the magnetic material between the conductors, and means actuated by the magnetic flux produced in said gap by the current in said conductors for indicating when the current exceeds a predetermined amount.

2. In combination, a tank formed from magnetic material and containing electrical apparatus, two spaced conductors entering the tank to conduct current through the apparatus, a substantially non-magnetic member forming part of the tank between said conductors to break the magnetic paths around said conductors, a relay armature movably mounted on the tank, said armature providing a path across the non-magnetic member for flux produced by the current flowing in said conductors, and a contact member actuated by the armature when the current exceeds a predetermined value.

3. In combination, a tank containing electrical apparatus, two spaced conductors entering the tank to conduct current through the apparatus, a non-magnetic weld in the tank between said conductors, a relay armature movably mounted on the tank, said armature providing a path across the weld for flux produced by the current flowing in said conductors, and a contact member actuated by said armature when the current exceeds a predetermined value.

4. In combination, a tank containing electrical apparatus, two spaced conductors entering the tank to conduct current through the apparatus, a non-magnetic weld in the tank between said conductors, a relay armature movably mounted on the tank, said armature providing a path across the weld for flux produced by the current flowing in said conductors, a spring for biasing the armature in one direction, and said armature being actuated in the opposite direction by said flux when the current exceeds a predetermined value.

5. In combination, a tank containing electrical apparatus, two spaced conductors entering the tank to conduct current through the apparatus, a non-magnetic member in the tank between said conductors, a relay armature movably mounted on the tank, said armature providing a path across the member for flux produced by the current flowing in said conductors, a spring for biasing the armature in one direction, and said armature being actuated in the opposite direction by said flux when the current exceeds a predetermined value.

6. An overload relay for a circuit breaker having a tank with two spaced conductors and a non-magnetic member in the tank between the conductors, said relay comprising an armature pivotally mounted on the tank at one side of the non-magnetic member, a pole piece mounted on the tank at the other side of the non-magnetic member, said armature providing a path across the non-magnetic member for flux produced by current in the conductors, spring means biasing the armature to provide an air gap between one end of the armature and the pole piece, and said armature being actuated into engagement with the pole piece when the current in the conductors exceeds a predetermined value.

7. An overload relay for a circuit breaker having a tank with two spaced conductors and a non-magnetic weld in the tank between the conductors, said relay comprising an armature pivotally mounted on the tank at one side of the non-magnetic weld, a pole piece mounted on the tank at the other side of the non-magnetic weld, said armature providing a path across the non-magnetic weld for flux produced by current in the conductors, spring means biasing the armature to provide an air gap between one end of the armature and the pole piece, and said armature being actuated into engagement with the pole piece when the current in the conductors exceeds a predetermined value.

8. An overload relay for a circuit breaker having a tank with two spaced conductors and a non-magnetic weld in the tank between the conductors, said relay comprising an armature pivotally mounted on the tank at one side of the weld, a pole piece mounted on the tank at the other side of the weld, said armature providing a path across the weld for flux produced by current in the conductors, spring means biasing the armature to provide an air gap between one end of the armature and the pole piece, adjusting means for changing the length of said air gap, and said armature being actuated into engagement with the pole piece when the current in the conductors exceeds a predetermined value depending upon the length of the air gap.

9. An overload relay for a circuit breaker having a tank with two spaced conductors and a non-magnetic member in the tank between the conductors, said relay comprising an armature pivotally mounted on the tank at one side of the weld, a pole piece mounted on the tank at the other side of the weld, said armature providing a path across the weld for flux produced by current in the conductors, spring means biasing the armature to provide an air gap between one end of the armature and the pole piece, adjusting means for changing the length of said air gap, and said armature being actuated into engagement with the pole piece when the current in the conductors exceeds a predetermined value depending upon the length of the air gap.

10. An overload relay for a circuit breaker having a tank with two spaced conductors and a non-magnetic member in the tank between the conductors, said relay comprising an armature pivotally mounted on the tank at one side of the non-magnetic member, a pole piece mounted on the tank at the other side of the non-magnetic member, said armature providing a path across the non-magnetic member for flux produced by current in the conductors, spring means biasing the armature to provide an air gap between one end of the armature and the pole piece, adjusting means for changing the length of said air gap, said armature being actuated into engagement with the pole piece when the current in the conductors exceeds a predetermined value depending upon the length of the air gap, a movable contact member carried by the armature, a fixed contact member engaged by the movable contact member when the armature engages the pole piece, and a shading coil on the pole piece to reduce chattering of the armature when it engages the pole piece.

11. An overload relay for a circuit breaker having a tank with two spaced conductors and a non-magnetic weld in the tank between the conductors, said relay comprising an armature pivotally mounted on the tank at one side of the non-magnetic weld, a pole piece mounted on the tank at the other side of the non-magnetic weld, said armature providing a path across the non-magnetic weld for flux produced by current in the conductors, spring means biasing the armature to provide an air gap between one end of the armature and the pole piece, adjusting means for changing the length of said air gap, said armature being actuated into engagement with the pole piece when the current in the conductors exceeds a predetermined value depending upon the length of the air gap, a movable contact weld carried by the armature, a fixed contact weld engaged by the movable contact member when the armature engages the pole piece, and a shading coil on the pole piece to reduce chattering of the armature when it engages the pole piece.

12. In combination, a tank containing electrical apparatus, two spaced conductors entering the tank to conduct current through the apparatus, a non-magnetic member in the tank between said conductors, a relay armature movably mounted on the tank, said armature providing a path cross the non-magnetic member for flux produced by the current flowing in said conductors, a spring for biasing the armature in one direction, adjustable stop means for limiting the movement of the armature in said one direction, and said armature being actuated in the opposite direction by said flux when the current exceeds a predetermined amount.

13. In combination, a tank containing electrical apparatus, two spaced conductors entering the tank to conduct current through the apparatus, a non-magnetic weld in the tank between said conductors, a relay armature movably mounted on the tank, said armature providing a path across the non-magnetic weld for flux produced by the current flowing in said conductors, a spring for biasing the armature in one direction, adjustable stop means for limiting the movement of the armature in said one direction, and said armature being actuated in the opposite direction by said flux when the current exceeds a predetermined amount.

14. In combination, a circuit breaker tank having two spaced terminal bushings on the top of the tank, a conductor centrally disposed in each bushing, a non-magnetic weld in the tank between the bushings, a relay armature pivotally mounted on the tank at one side of the weld, a pole piece mounted on the tank at the other side of the weld, said armature extending across the weld to provide a path for flux produced by current in the conductors, a spring for biasing the armature away from the pole piece, said armature being actuated into engagement with the pole piece when the current exceeds a predetermined amount, a fixed contact member on the tank, and a contact member carried by the armature to engage the fixed contact member.

References Cited by the Examiner

UNITED STATES PATENTS

| | | | |
|---|---|---|---|
| 890,697 | 6/1908 | Noeggerath | 200—87 |
| 2,484,863 | 10/1949 | Stilwell | 200—87 |

ROBERT K. SCHAEFER, *Acting Primary Examiner.*